C. P. A. FRIBERG.
TOOL OR TOOLS FOR EARTHWORKING IMPLEMENTS.
APPLICATION FILED MAR. 9, 1909.

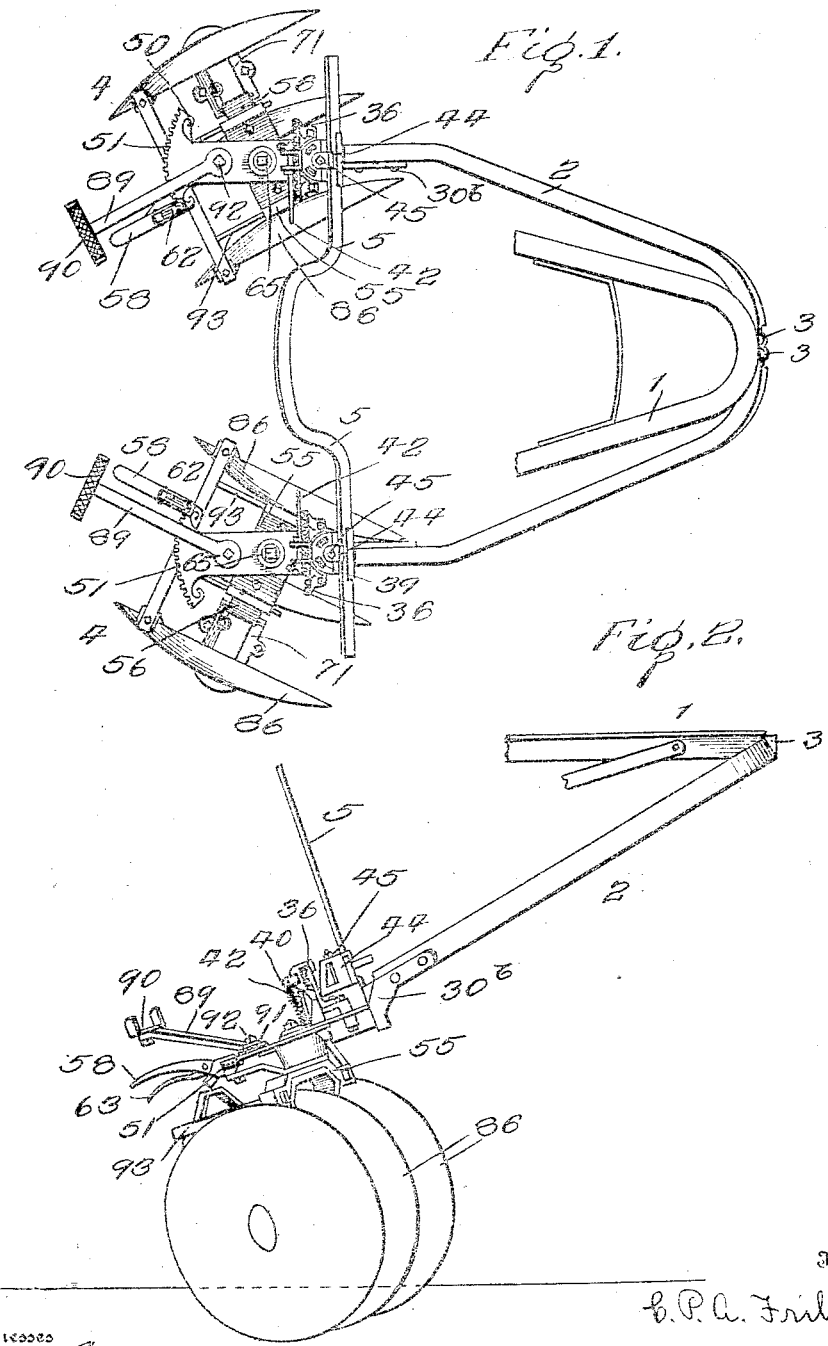

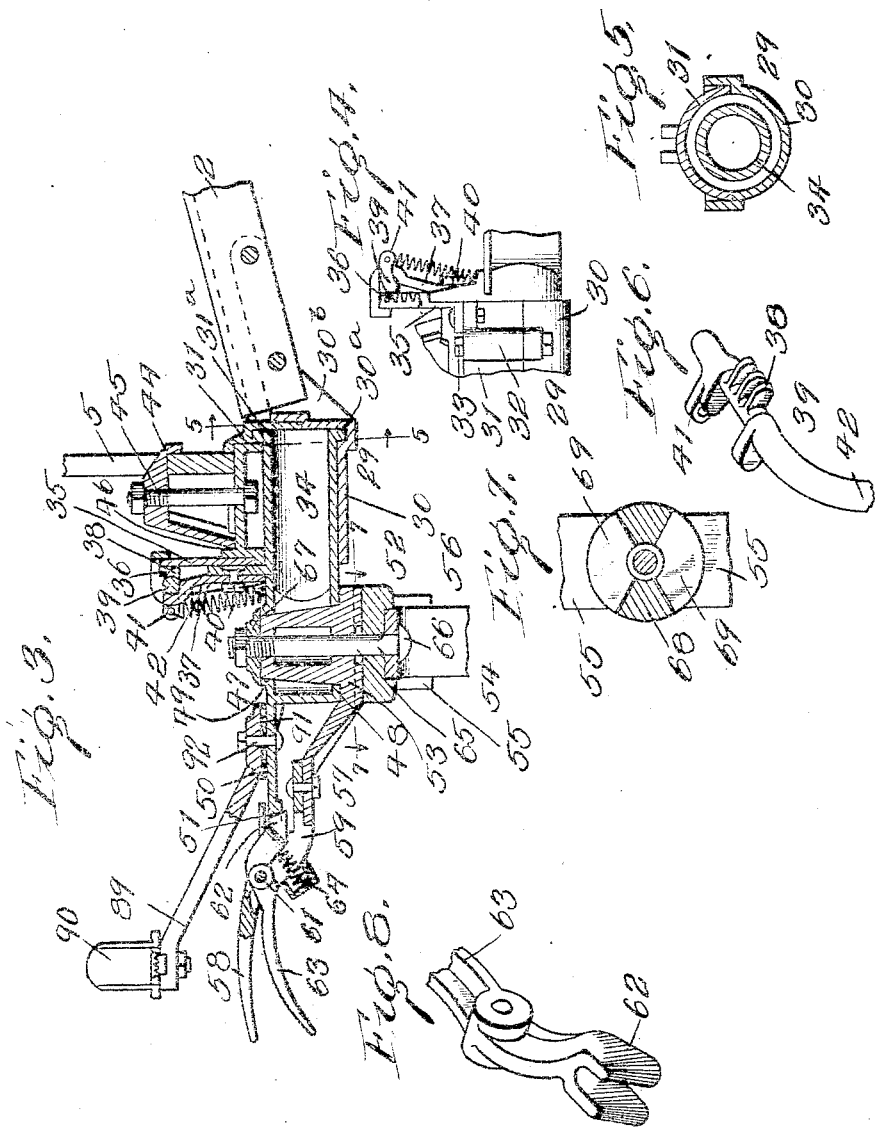

1,054,404.

Patented Feb. 25, 1913.
3 SHEETS—SHEET 3.

Witnesses
B. G. Brown
R. S. Gehr

Inventor
C. P. A. Friberg
By H. H. Bliss
Attorney

UNITED STATES PATENT OFFICE.

CHARLS P. A. FRIBERG, OF MOLINE, ILLINOIS, ASSIGNOR TO DEERE & MANSUR CO., A CORPORATION OF ILLINOIS.

TOOL OR TOOLS FOR EARTHWORKING IMPLEMENTS.

1,054,404.      Specification of Letters Patent.      Patented Feb. 25, 1913.

Original application filed January 2, 1908, Serial No. 409,034. Divided and this application filed March 9, 1909. Serial No. 482,311.

*To all whom it may concern:*

Be it known that I, CHARLS P. A. FRIBERG, a citizen of the United States, residing at Moline, in the county of Rock Island and State of Illinois, have invented certain new and useful Improvements in Tool or Tools for Earthworking Implements, of which the following is a specification, reference being had therein to the accompanying drawing.

This invention relates to earth working tools such, for example, as are employed in connection with cultivators.

The object of the invention is to provide improved devices for adjustably supporting the tools.

It will be understood from the description which follows that some, at least, of my improvements are applicable to tools of various forms. This application is a division of my earlier application for cultivators, filed Jan. 2, 1908, Ser. No. 409,034, and I have accordingly shown my invention only as applied to the disk form of tools shown in said earlier application.

Figure 9:
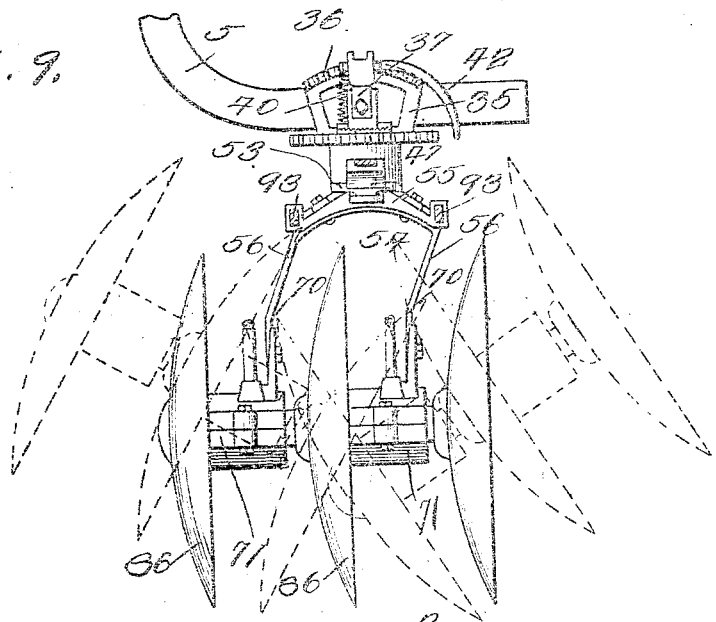
Figure 10:
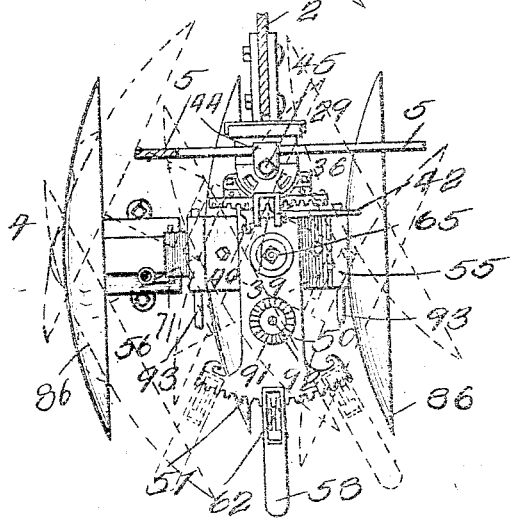

In the drawings—Figure 1 is a plan view of a pair of tool gangs and parts of a cultivator with which they are more or less directly associated. Fig. 2 is a side elevation of the parts shown in Fig. 1. Fig. 3 is a vertical section of the parts which carry and support a tool gang. Figs. 4, 5, 6, 7 and 8 show, detached, some of the detail parts illustrated in Fig. 3, the sections of Figs. 5 and 7 being taken on the line 5—5 and 7—7, respectively, of Fig. 3. Fig. 9 is a rear elevation of one of the tool gangs. Fig. 10 is a plan view of the parts shown in Fig. 9.

Referring in detail to the construction shown, 1 indicates a portion of the rigid wheel frame of a cultivator, such as is shown in my earlier application referred to above.

2 are drag bars flexibly connected at their front ends, preferably by ball and socket joints 3, 3, to the said wheel frame.

4, 4 designate as entireties two gangs of tools connected with the lower rear ends of the drag bars.

5 is a distance bar disposed between the two gangs of tools for the purpose of maintaining them in proper relation to each other.

My present invention relates more especially to devices by which the tools are carried and supported. These parts are arranged and constructed as follows: 29 indicates a box-like part having the lower element or half 30, and the upper element 31. These are formed with a chamber of such character as to accommodate a journal-like part 34, to be fitted therein. The upper and lower elements or halves 30, 31, are secured together by ears 32 and bolts 33. The lower part 30 has forward projecting bars or extensions 30ᵇ between which the drag bar 2 is secured. The said parts 30 and 31 are so shaped as to provide, when they are secured together, an annular chamber or recess 30ᵃ into which is fitted a flange 31ᵃ on the end of the journal part 34. This part 34 can be rotated more or less on a horizontal axis in the box structure provided by the parts described and can be fastened in any of several positions.

35 is a plate secured rigidly to the upper element of the box and having tapered or wedge-shaped lock teeth 36 with their thinner edges extending downward.

37 is an arm or bar carried by the journal element 34 and it supports a rock shaft 39. The latter carries wedge-shaped detents 38 adapted to be engaged with and disengaged from the teeth 36. These detents 38 have their thinner edges extending upward and their ends are beveled or eccentrically rounded so as to secure a continuous or cam-like engagement with the sides of the teeth 36, when the detents are moved into locking position. The rock shaft 39 has a lug 41 at one end, to which a spring 40 is attached which tends to hold the detents 38 in engagement with the teeth 36, and by reason of the wedge shape of said detents and teeth, the disk carrier is held firmly in adjusted position without play. The rock-shaft 39 has a handle 42 by which it can be readily turned sufficiently to disengage the detent when adjustment is to be made. The bar 5 by which the two gangs are connected is arched centrally to pass over the plants of a row and has its ends extending laterally and horizontally. To these horizontally extending end sections of the bar the box structures just described are clamped in the manner shown.

44 is a clamp block adapted to be mounted in a seat at 46 in the top of the box element 31. 45 is a clamping bolt by which this block 44 can be forced tightly downward upon the end of the arch-bar 5.

The journal part 34 above referred to is one section of the supporting bar or plate from which extend downward the devices that carry the tools. The supporting bar or plate referred to is indicated as an entirety by 47. At 48, 49 it is formed with a bearing for a vertically arranged journal element to be described. Preferably it is cast hollow so that it can be made sufficiently large and at the same time be light. The bearings at 48, 49 are preferably tapered apertures, that at 48 being somewhat larger in diameter than that at 49. The rear part or extension of this supporting bar or plate is indicated by 50. At its outer end it has a series of wedge-shaped locking teeth 51.

The carrier for the tools is indicated as a whole by 52 and is formed with an upper part 53 and a lower part 54. The upper part 53 is formed with a journal section which is seated in the bearings at 48, 49, and is preferably coned or tapered somewhat as shown in Fig. 3. Rearward from this there extends an upwardly turned plate or arm 57 which lies below the plate 50. At its rear end it has a handle 58 connected to the part 57 by a curved or inclined section 59. On the parts 58, 59 there is mounted a detent lever having wedge-shaped detents 62 and a handle 63, these being held by a pivot 61. At 64 there is a spring bearing against the detent end of the lever and tending to hold the inclined faces of the detents in engagement with the correspondingly inclined faces of the teeth 51 on the plate 50. Whenever the operator desires to adjust the cultivator tools around the vertical axis he grasps the handles 58 and 63 and draws upward on the latter. This releases the detent 62 from the teeth 51 and unlocks the disk carrier. Thereupon he can swing the parts 58 and 57 and with them the disk carrier to the right or to the left as desired, and upon releasing the handle 63, the spring 64 insures its being tightly locked in the position of new adjustment.

The lower part 54 of the carrier has laterally extending arms 55 and to these are secured the suspending arms or bars 56. The latter, together with the part 54 and the upper part 53 of the hanger are secured rigidly together by the clamp bolt 65, the head 66 of which lies under the suspending device 56, and which is provided with a clamping nut at its upper end.

67 is a washer which receives the thrust when the above mentioned parts are drawn upward by the bolt.

Under some circumstances, it is desirable to invert the gang of tools, that is, turn them end for end, as shown in Figs. 9 and 10, so that the disk will throw the earth outward instead of inward. This is here provided for by forming the engaging surfaces of the upper part 53 and lower part 54 of the carrier in the way shown in Figs. 3 and 7. 68 are lugs formed on the lower surface of the upper part 53, and 69 are lugs formed on the upper face of the lower part 54. To invert or turn end for end the lower part of the disk hanger it is only necessary to loosen the nut on the bolt 65 sufficiently to permit the lugs 68 and 69 to drop out of engagement, whereupon the inverting of the gang is permitted. After it has been turned half way around, the nut and bolt are again drawn tightly to place.

The lower ends 70 of the suspending devices 56 are secured to bearing boxes 71 in which the gang of disks 86 are mounted in any preferred or suitable manner.

The operator has control of the positions of the gangs, to some extent, through the foot-bars 89 and the stirrups 90 rising from the plate 50. Each bar and support can be adjusted by means of a rose-plate connection at 91, the opposing elements of the adjusting device being secured together by a bolt at 92.

Scrapers are supported by the parts shown at 93, these being bars secured in seats or sockets formed on the lower part 54 of the disk carrier and being readily adjustable therewith to any position taken by the gang. These scraper supporting bars can be withdrawn when desired and inverted, as will be necessary when the disk gang is turned end for end in the way above described.

It will, of course, be understood that when a tool gang is used on a cultivator, suitable means will be employed for raising and lowering it and for adjustably suspending it, so as to work the earth to the desired depth, this vertical adjustment supplementing the other adjustments of the gang which have been described. It is obvious also that the gangs may be adjusted toward or from each other and maintained in such adjusted position by the bar 5.

What I claim is—

1. In a cultivator, the combination with a tool gang of the rotatably adjustable supporting bar, the carrier supported on said bar and adjustable on a vertical axis, said carrier being formed in two parts, of which one can be inverted with respect to the other, means for clamping the two parts of the carrier together, and a locking hand-lever on the part of the carrier which is not inverted for adjusting the carrier and holding it in adjusted position, substantially as set forth.

2. In a cultivator, the combination with a tool gang of a rotatably adjustable supporting bar, the carrier supported on said bar, and adjustable on a vertical axis, said carrier being formed in two parts, of which one can be inverted relative to the other, fastening devices adapted to permit loosening of the parts of the carrier without separation to effect the said inverting, and a locking hand lever on the part of the carrier which is not inverted for adjusting the carrier and holding it in adjusted position, substantially as set forth.

3. In a cultivator, the combination with a tool gang, of a holder comprising a supporting bar and the carrier secured to the said bar, said carrier being adjustable on a vertical axis and formed in two interlocking parts, of which one can be inverted relative to the other, means for clamping together the said two parts, and a locking hand lever on the part of the carrier which is not inverted for adjusting the carrier and holding it in adjusted position, substantially as set forth.

4. In a cultivator, the combination with a tool gang, of the adjustable supporting bar mounted on a horizontal axis, the adjustable carrier made in two interlocking parts, of which one can be inverted when unlocked from the other, means for clamping the said two parts together and to the supporting bar, and a locking hand lever on the part of the carrier which is not inverted for adjusting the carrier and holding it in adjusted position, substantially as set forth.

5. In a cultivator, the combination with a tool gang, of the vertically arranged, horizontally adjustable carrier, the supporting bar secured to the carrier, and having a horizontally arranged flanged journal part, and the box or bearing for the journal formed in two parts, adapted to be clamped together, said parts being recessed to receive the flange of the journal, the journal being rotatably adjustable in the box or bearing, and the lock comprising the toothed rack and the detent lever for holding said journal in adjusted position, substantially as set forth.

6. In an earth-working implement, the combination of a draft frame, a tool support or carrier adjustably connected with the draft frame on a forwardly extending axis, a transverse series of detents on the draft frame, a movable locking tooth mounted on the tool support for engaging the said detents, the tool adjustably secured to the said support on an upwardly and downwardly directed axis, and means for locking the tool in adjusted position, comprising a series of detents rigidly connected with the tool support, a locking tooth carried by the tool, said tooth being mounted to move in a plane transverse to the series of detents into and out of engagement with said detents, one of said locking elements having engaging surfaces inclined to the direction of movement of the tooth, and yielding means engaging the tooth and normally pressing it wedge-like between the said locking detents, whereby the parts are held against play, substantially as set forth.

7. In an earth-working implement, the combination of a draft frame, a tool support or carrier adjustably connected with the draft frame on a forwardly extending axis, a transverse series of detents on the draft frame, a movable locking tooth mounted on the tool support for engaging the said detents, the tool adjustably secured to the said support on an upwardly and downwardly directed axis, and means for locking the tool in adjusted position, comprising a series of wedge-shaped detents rigidly connected with the tool support, a movably mounted wedge-shaped locking tooth carried by the tool and adapted to be moved into and out of engagement with said detents, and means for yieldingly pressing the inclined faces of the tooth in engagement with the inclined faces of the detents, substantially as set forth.

8. In an earth-working implement, the combination of the tool support or carrier, the tool adjustably secured to said support, and means for locking the tool in adjusted position, comprising a series of detents rigidly connected with the tool support, a pivotally mounted locking tooth carried by the tool and adapted to be moved into and out of engagement with said detents, said tooth being wedge-shaped in transverse section and having its free end eccentrically rounded, and means for pressing the tooth yieldingly in engagement with the detents.

In testimony whereof I affix my signature, in presence of two witnesses.

CHARLS P. A. FRIBERG.

Witnesses:
 Oscar F. Lundahl,
 Robert M. Adams.

---

Copies of this patent may be obtained for five cents each, by addressing the "Commissioner of Patents, Washington, D. C."